Figure 1:
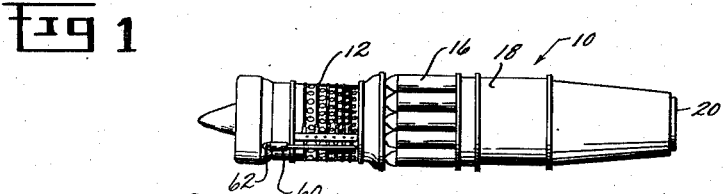

Oct. 28, 1958

R. C. ALLEN 2,858,062

VARIABLE STATOR MECHANISM

Filed Jan. 24, 1955

2 Sheets-Sheet 1

INVENTOR.
RICHARD C. ALLEN
BY Edward M. Zitle
HIS ATTORNEY

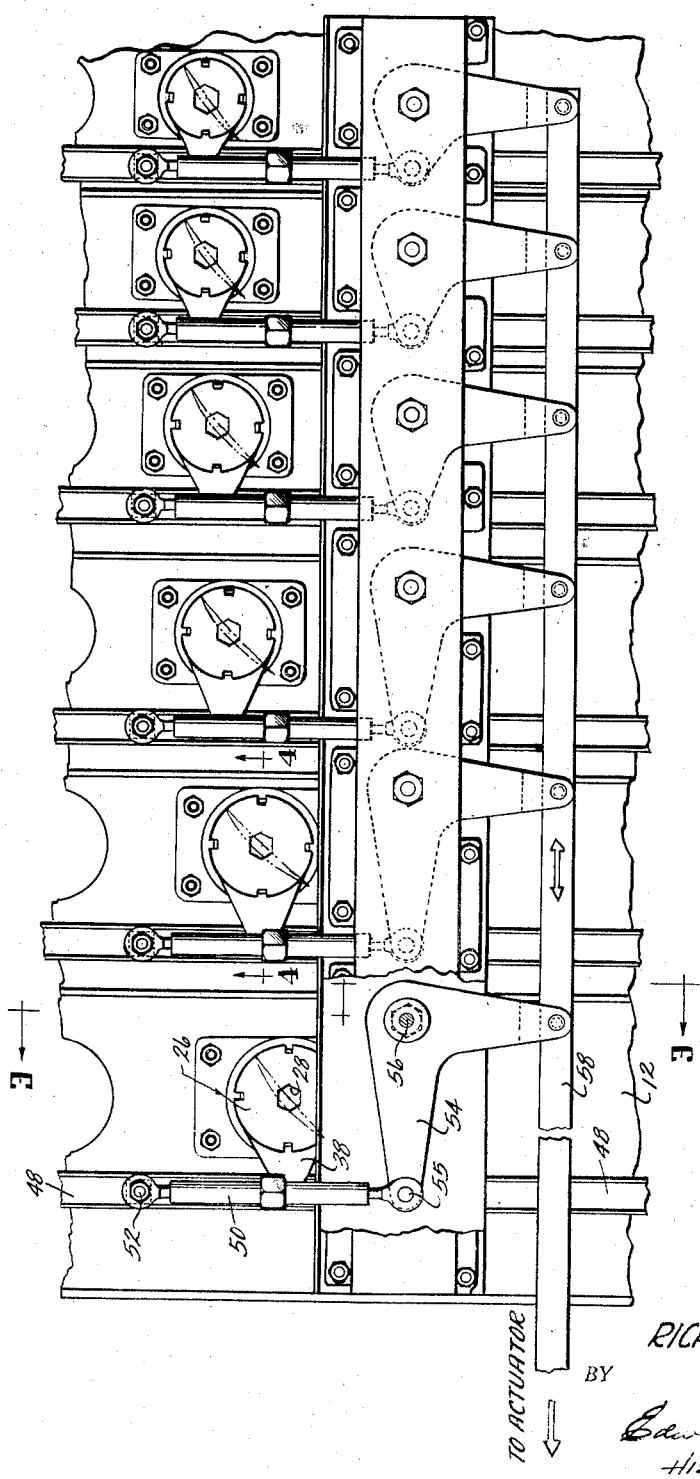

United States Patent Office 2,858,062
Patented Oct. 28, 1958

2,858,062

VARIABLE STATOR MECHANISM

Richard C. Allen, Cincinnati, Ohio, assignor to General Electric Company, a corporation of New York Application January 24, 1955, Serial No. 483,602

5 Claims. (Cl. 230—114)

This invention relates to a gas turbine type engine and in particular to a variable stator mechanism for an axial flow compressor for a gas turbine type engine.

In order to obtain more thrust from a turbojet engine, it is desirable to have a high pressure ratio compressor for the engine. However, when a high pressure ratio compressor is used, stall characteristics occur during various stages of increasing speed. In order to prevent these stall characteristics from occurring, it is desirable to incorporate stator vanes which are adapted to be varied so as to provide the correct airfoil position for the particular velocity of flowing air. The operating characteristics of the compressor are improved by this method under certain running conditions by changing the direction or quantity of air flow. It is therefore an object of this invention to provide a multiple positioning and scheduling device for actuating the angles of attack of one or more stages, or rows, of stationary vanes in an axial-flow compressor simultaneously according to a predetermined relationship.

In order to eliminate the stall characteristics in some high pressure ratio compressors, the stages of stator vanes of the compressor must be rotated a different amount. It often becomes desirable to adjust the stages of stator vanes by varying or equal amounts simultaneously according to a predetermined schedule. It is therefore another object of this invention to rotate each stage of stator vanes of a compressor by various amounts simultaneously and according to a predetermined schedule relative to each other.

It is still another object of this invention to provide a device for varying the stator vanes of a compressor of an aircraft gas turbine by a sensitive linkage arrangement in which each actuating band is operated by a bellcrank having a different throw for each stage and in which each stator vane is operated by a lever which is different in length from the levers of adjacent stages of stator vanes, so that the amount of turning movement of a stator vane is governed by the length of the bellcranks and the lever arm lengths.

It is a still further object of this invention to provide a device for varying each stage of stator vanes a predetermined amount from its adjacent stages by providing rotatable stator vanes connected to lever arms having different lengths for each stage, said lever arms being connected to actuator bands each of which is operated by a bellcrank, the bellcranks being pivotally mounted on the compressor casing and also having their throw for each stage an amount different from the throw of the bellcranks of adjacent stages, the bellcranks being turned through equal angles by a common actuator rod so that the stages of stator vanes are rotated according to a linear relationship.

Another object of the invention is to provide a lever sufficiently rigid to turn the stator vanes against the aerodynamic loads exerted thereon and sufficiently flexible to permit the turning and rotation of the lever arms and actuator bands in different planes.

Briefly stated and in accordance with one aspect of my invention, I provide a variable stator mechanism for stages of stator vanes of an axial flow compressor which includes a plurality of bellcranks and lever arms so interconnected so as to adjust the stator vanes according to a linear relationship which could be an equal or unequal amount of travel between the stages.

Figure 3:
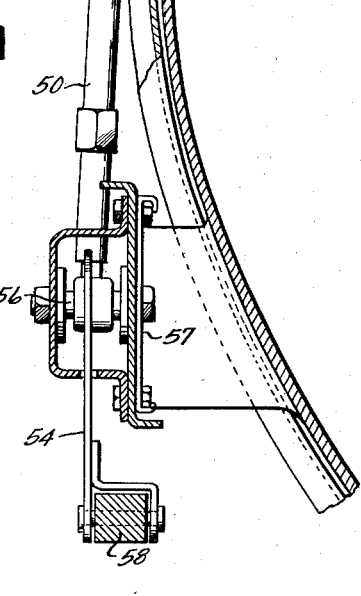
Figure 5:
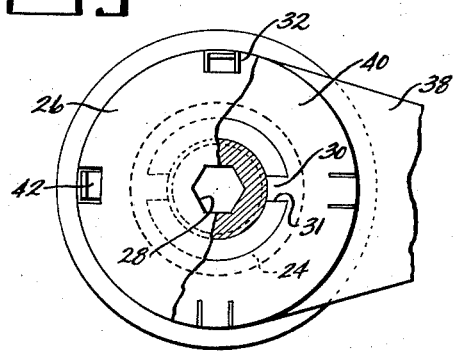
Figure 4:
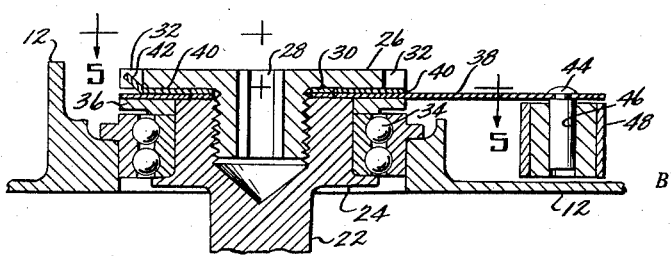

These and other objects will become more apparent when read in the light of the accompanying drawings and specifications wherein the parts are specifically referred to but are intended to be as generic in their application as the prior art will permit, and wherein similar parts have like numbers and wherein;

Figure 1 is a plan view of a standard gas turbine type engine having a compressor, combustion chamber, and turbine, Figure 2 is an elevational view showing the actuator rod, bellcranks, turnbuckles and actuator bands for actuating the stator vanes, Figure 3 is a cross-sectional view taken on lines 3—3 of Figure 2 showing the bellcrank and turnbuckle arrangement, Figure 4 is a cross-sectional view showing the mounting for the stator vanes, Figure 5 is a top plan view, partly in section, taken on lines 5—5 of Figure 4.

Referring to the figures, the numeral 10 generally designates a jet engine having an axial-flow compressor 12 provided with combustion chambers 16, turbine 18 and exhaust nozzle 20. Mounted in the casing of the compressor 12 are a plurality of vanes 22. The stator vanes 22 are integral with bases 24. A screw 26 is positioned in base 24 by threading or other suitable means. The screw 26 is provided with an opening 28 to permit insertion of a wrench for the tightening or loosening thereof. The screw 26 is provided with a plurality of slots 32 the purpose of which will be hereinafter explained. In order for the stator vane to rotate, a bearing 34 is positioned between the casing 12 and base 24. The spacer 36 is positioned between the bearing 34 and the lever arm 38. The lever arm 38 is provided with a tab-washer 40 fixed thereto as by welding or the like. The tab-washer 40 is provided with a plurality of tangs 42 adapted to engage the slots 32 of the screw 26. Both lever arm 38 and tab-washer 40 have congruent internal projections 30 which engage slots 31 provided in the head of base 24 to insure positive entrainment.

In order to rotate the lever arm 38 so as to rotate the stator vane, the lever arm 38 is provided with a pin 44 which is adapted to fit into an opening 46 in the actuator band 48. Since the pin 44 will tend to move out of its radial direction with respect to the axis of the compressor and the opening 46 will tend to retain its radial direction as the band is actuated, the arm 38 is so dimensioned that it is inherently flexible. Other means may be provided to allow freedom of movement of the pin 44 with respect to the opening 46 without binding. Such a means is found in co-pending application Serial No. 544,172, filed November 1, 1955. For each stage of stator vanes, the lever arms 38 are of different length according to a predetermined schedule.

Each stage of stator vanes is provided with an actuator band 48. In order to actuate the actuator band 48 a turnbuckle arrangement 50 is pivotedly fixed to the actuator band as shown at 52. This can be any type of universal connection, or the like. The other end 55 of the turnbuckle 50 also has a universal connection and is pivotedly connected to a bellcrank 54. The bellcrank 54 is pivotedly connected at its fulcrum at 56 to the casing 12 by a bracket 57. It is noted that the distance from the pivot point 56 to the pivot point 55 varies for each stage of stator vanes according to a linear relationship (Figure 2). In order to actuate the bellcranks 54, an actuating or connecting rod 58 is provided to which the bellcranks 54 are pivotedly connected. The connecting rod 58 extends along the casing 12. In order to operate the connecting rod, an actuator is shown at 60 which is pivotedly connected to the casing 12 as shown at 62 (Figure 1).

In order to accelerate a high pressure ratio compressor from zero speed to maximum speed, stall conditions take place at various intermediate speeds. The area in which these stall conditions exist can be found for each engine. In order to eliminate the stall at the various speeds, each stage of stator vanes are rotated a predetermined amount to present the correct angle of attack for the air flow at that particular speed. Therefore, the mechanism can be so dimensioned as to give the correct amount of turn to each stage of stator vane so as to prevent stalls at any of the particular speeds. A linear relationship has been found to be satisfactory. The actuator 60 can be provided with a control responsive to the various speeds so as to automatically position the stator vanes for the particular speeds desired. Therefore, whenever the actuator 60 operates rod 58, the bellcranks are pivoted through equal angles about their fulcrum 56. Since the bellcranks have different lever arm lengths for each stage as shown at 55 and 56, varying amounts of movement will be given to the turnbuckle 50 and in turn the actuator bands 48. The actuator bands 48 move the lever arms 38. Since the lever arms are also of different lengths for each of the stages of stator vanes, the rotary motion transmitted to the stator vanes will thereby be of a variable amount for each stage. Since the lever arms 38 are connected to bases 24 of the stator vanes 22, any movement of the lever arms 38 will be translated to the stator vanes 22.

It is evident that a desired schedule of motion can be achieved from a single point of actuation by this mechanism as long as the linear relationship exists between the amount of motion desired at the varoius positions. Also, the turnbuckle 50 allows for initial zero setting of the band to compensate for any manufacturing tolerances. This is an important feature since there are a number of manufactured parts in the device and an accumulation of manufacturing tolerances can give a considerable amount of variation. In order to avoid this, the turnbuckles permit adjustment which eliminates the effect of manufacturing tolerances upon the setting of the bands in the positioning of the stator vanes.

The specific embodiment described above has been given by way of illustration and not by way of limitation. Many modifications and improvements can be made to the above design without departing from the spirit and scope of the invention, all of such modifications and improvements are to be regarded as equivalents and be included within the spirit and scope of this invention.

What I claim as new and desire to secure by Letters Patent of the United States is:

1. In an axial flow compressor having a plurality of stages of adjustable stator vanes, actuating means for actuating the stages of adjustable stator vanes simultaneously, a plurality of bellcranks fixed to said actuating means and pivotally connected to said compressor, each of said bellcranks having one arm of equal length and the lever arm of a different length as an adjacent bellcrank, an actuator band for each stage, each of said bellcranks being provided with adjustable means connecting each bellcrank to each actuator band, each of said actuator bands being connected to a plurality of stages of lever arms, said lever arms in a stage being of different lengths from the other stages and being fixed to said stator vanes so as to actuate the stator vanes according to a predetermined schedule.

2. In a high pressure-ratio compressor, comprising a plurality of stages of adjustable stator vanes, each adjustable stator vane being provided with a lever arm, the length of said lever arm being of a different length than some of the other stages of stator vanes, an actuator band for each stage, said lever arm being pivotally connected to an actuator band, each of said actuator bands being provided with a turnbuckle arrangement for adjustment thereof, a plurality of bellcranks pivotally secured to the compressor casing and pivotally connected to said turnbuckles, said bellcranks having one arm of equal length and one arm of variable length, an actuator for actuating said stator vanes, whereby the stator vanes are actuated a predetermined amount for each adjacent stage as a result of the variable lengths of the bellcranks and lever arms.

3. An axial flow compressor comprising a plurality of stages of adjustable stator vanes, means for simultaneously rotating said stages of stator vanes through predetermined angles according to a linear relationship, said means including a bellcrank for each stage of stator vanes, one arm of each bellcrank being of equal length, the other arm of each bellcrank being of different lengths, means for turning said bellcranks through equal angles, and lever arm means connecting said bellcranks to said stator vanes.

4. In a compressor for a turbomachine comprising stages of rotatable stator vanes, lever means and bellcrank means interconnected with said stator vanes, means for actuating said bellcrank means through equal angles, said lever means and bellcrank means having different arm lengths cooperating to turn each stage of stator vanes through angles according to a linear relationship.

5. In a compressor for a turbomachine comprising stages of adjustable stator vanes, lever means and bellcrank means interconnected with said stator vanes, means for actuating said bellcrank means, an actuator band for each stage, said lever means and bellcrank means being connected to the actuator band which has rotational and translatory motion, the lever means and bellcrank means having different lever arm lengths to provide a linear relationship with respect to the adjustment of the stages of rotatable stator vanes.

References Cited in the file of this patent

UNITED STATES PATENTS 2,371,706     Planiol _____ Mar. 20, 1945